(12) United States Patent
Cardozo et al.

(10) Patent No.: US 11,646,602 B2
(45) Date of Patent: May 9, 2023

(54) TOPOLOGY AND PHASE DETECTION FOR ELECTRICAL SUPPLY NETWORK

(71) Applicant: Landis+Gyr Innovations, Inc., Alpharetta, GA (US)

(72) Inventors: Ruben E. Salazar Cardozo, Johns Creek, GA (US); David Decker, Atlanta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 447 days.

(21) Appl. No.: 16/815,707

(22) Filed: Mar. 11, 2020

(65) Prior Publication Data

US 2021/0288520 A1    Sep. 16, 2021

(51) Int. Cl.
| | |
|---|---|
| *H02J 13/00* | (2006.01) |
| *G06N 20/00* | (2019.01) |
| *H01Q 1/22* | (2006.01) |
| *H04W 84/12* | (2009.01) |

(52) U.S. Cl.
CPC ........ *H02J 13/00002* (2020.01); *G06N 20/00* (2019.01); *H01Q 1/2233* (2013.01); *H02J 13/00006* (2020.01); *H04W 84/12* (2013.01)

(58) Field of Classification Search
CPC .......... H02J 13/00002; H02J 13/00006; G06N 20/00; H01Q 1/2233; H04W 84/12; H04L 41/142; H04L 43/024; H04L 43/16; H04L 41/0816; H04L 43/08; H04L 41/12; Y02E 60/00; Y04S 40/00; Y04S 40/12
See application file for complete search history.

(56) References Cited

U.S. PATENT DOCUMENTS

| | | |
|---|---|---|
| 6,615,147 B1 | 9/2003 | Jonker et al. |
| 6,816,360 B2 | 11/2004 | Brooksby et al. |
| 7,135,850 B2 | 11/2006 | Ramirez |

(Continued)

FOREIGN PATENT DOCUMENTS

| | | |
|---|---|---|
| WO | 2018027180 | 2/2018 |
| WO | 2018072030 | 4/2018 |

(Continued)

OTHER PUBLICATIONS

U.S. Appl. No. 16/057,178, Final Office Action, dated Oct. 29, 2020, 17 pages.

(Continued)

*Primary Examiner* — Ziaul Karim
(74) *Attorney, Agent, or Firm* — Kilpatrick Townsend & Stockton LLP

(57) ABSTRACT

A system for detecting the topology and phase information of an electrical power distribution system is provided. For example, the system includes a group of meters connected to an electrical power distribution system and can communicate with each other through local network connections such as a mesh network. Each of the meters is configured to generate and transmit voltage data to a correlator of the group of meters. The correlator calculates the correlations between each pair of meters in the group based on the voltage data received and further transmits the calculated correlations to a mapper through the mesh network. The mapper determines the topological or phase relationship between at least the group of meters based on the received correlations.

15 Claims, 8 Drawing Sheets

(56) References Cited

U.S. PATENT DOCUMENTS

| | | | |
|---|---|---|---|
| 7,469,190 B2 * | 12/2008 | Bickel | H02J 3/01 |
| | | | 702/69 |
| 7,693,670 B2 | 4/2010 | Durling et al. | |
| 7,990,806 B2 | 8/2011 | Chen | |
| 8,004,933 B2 | 8/2011 | Iseli | |
| 8,121,741 B2 | 2/2012 | Taft et al. | |
| 8,223,466 B2 | 7/2012 | Roscoe | |
| 8,322,215 B2 | 12/2012 | Lakich et al. | |
| 8,326,554 B2 | 12/2012 | Caird | |
| 8,635,036 B2 | 1/2014 | Pamulaparthy et al. | |
| 8,754,634 B2 | 6/2014 | Chamarti et al. | |
| 8,830,083 B2 | 9/2014 | LaFrance et al. | |
| 8,854,217 B2 | 10/2014 | Brown et al. | |
| 8,947,246 B2 | 2/2015 | Aiken | |
| 8,978,443 B2 | 3/2015 | Ramirez | |
| 8,996,144 B2 | 3/2015 | LaFrance et al. | |
| 9,164,135 B2 | 10/2015 | Cs et al. | |
| 9,304,014 B2 | 4/2016 | Komati et al. | |
| 9,341,686 B2 | 5/2016 | Deak et al. | |
| 9,476,740 B2 | 10/2016 | Zigovszki et al. | |
| 9,557,392 B2 | 1/2017 | Schuhl et al. | |
| 9,568,522 B2 | 2/2017 | Aiello et al. | |
| 9,602,895 B2 | 3/2017 | Bowling et al. | |
| 9,658,081 B2 | 5/2017 | Vaswani et al. | |
| 9,671,254 B2 | 6/2017 | Zigovszki et al. | |
| 9,706,499 B2 | 7/2017 | Pike et al. | |
| 9,887,051 B2 | 2/2018 | LaFrance et al. | |
| 9,891,088 B2 | 2/2018 | Zigovszki et al. | |
| 10,237,338 B1 | 3/2019 | Torpy et al. | |
| 10,240,961 B2 | 3/2019 | Cheng et al. | |
| 10,254,315 B2 | 4/2019 | Higashi et al. | |
| 10,295,578 B2 | 5/2019 | Higashi et al. | |
| 11,183,878 B2 | 11/2021 | Kuloor et al. | |
| 11,245,260 B2 | 2/2022 | Davis | |
| 2011/0311051 A1 | 12/2011 | Resch et al. | |
| 2012/0182157 A1 | 7/2012 | Carr | |
| 2013/0217332 A1 | 8/2013 | Altman et al. | |
| 2014/0005853 A1 | 1/2014 | Chen et al. | |
| 2015/0052088 A1 * | 2/2015 | Arya | H02J 3/00 |
| | | | 706/12 |
| 2015/0241482 A1 * | 8/2015 | Sonderegger | G01R 19/003 |
| | | | 702/65 |
| 2015/0271557 A1 | 9/2015 | Tabe | |
| 2016/0276831 A1 | 9/2016 | Karlak et al. | |
| 2016/0352103 A1 * | 12/2016 | Aiello | G01R 19/2513 |
| 2017/0060161 A1 * | 3/2017 | Tyler | H02J 3/383 |
| 2017/0243138 A1 | 8/2017 | Dzierwa et al. | |
| 2017/0374573 A1 | 12/2017 | Kleinbeck et al. | |
| 2018/0073910 A1 | 3/2018 | Deak et al. | |
| 2018/0106640 A1 | 4/2018 | Padrones et al. | |
| 2019/0041436 A1 | 2/2019 | Kuloor et al. | |
| 2019/0041439 A1 | 2/2019 | Brown | |
| 2019/0041445 A1 | 2/2019 | Kuloor et al. | |
| 2019/0094329 A1 | 3/2019 | Minich | |
| 2019/0101411 A1 | 4/2019 | Davis et al. | |
| 2019/0129368 A1 | 5/2019 | Iacovella et al. | |
| 2019/0219618 A1 | 7/2019 | Davis et al. | |
| 2019/0383864 A1 | 12/2019 | Joshi et al. | |
| 2021/0265839 A1 | 8/2021 | Davis | |

FOREIGN PATENT DOCUMENTS

| | | |
|---|---|---|
| WO | 2018083902 | 5/2018 |
| WO | 2019026791 | 2/2019 |

OTHER PUBLICATIONS

Luan et al., "Smart Meter Data Analytics for Distribution Network Connectivity Verification", IEEE Transactions on Smart Grid, vol. 6, No. 4, Jul. 2015, pp. 1964-1971.

International Patent Application No. PCT/US2021/019993, International Search Report and Written Opinion dated Jun. 17, 2021, 14 pages.

U.S. Appl. No. 16/057,178, Notice of Allowance dated Jul. 23, 2021, 7 pages.

Short, "Advanced Metering for Phase Identification, Transformer Identification, and Secondary Modeling", IEEE Transactions on Smart Grid, vol. 4, No. 2, Jun. 2013, pp. 651-658.

U.S. Appl. No. 16/057,178, "Office Action", dated Jul. 13, 2020, 13 pages.

International Patent Application No. PCT/US2021/018980, International Search Report and Written Opinion dated Jun. 11, 2021, 14 pages.

U.S. Appl. No. 16/055,713, Non-Final Office Action, dated Mar. 18, 2020, 16 pages.

"Live Line Phase Identification—Phase ID 6000", Power Systems Integrity, Inc., available online at: http://www.psinteg.com/Phase_ID.html, accessed from Internet on Feb. 25, 2020, 2 pages.

Arya et al., "Phase Identification in Smart Grids", IEEE International Conference on Smart Grid Communications (SmartGridComm), Brussels, 2011, pp. 25-30.

Byun et al., "Cable and Phase Identification based on Power Line Communication", International Journal of Control and Automation, vol. 8, No. 9, 2015, pp. 63-74.

"IEEE Xplore Search Results", Mar. 24, 2021, 1 page.

U.S. Appl. No. 16/057,178, Notice of Allowance dated Apr. 8, 2021, 9 pages.

PCT/US2021/018980, International Preliminary Report on Patentability, dated Sep. 9, 2022, 10 pages.

PCT/US2021/019993, International Preliminary Report on Patentability, dated Sep. 22, 2022, 10 pages.

U.S. Appl. No. 16/800,315, Corrected Notice of Allowability dated Oct. 19, 2021, 4 pages.

U.S. Appl. No. 16/800,315, Notice of Allowance dated Oct. 1, 2021, 12 pages.

* cited by examiner

TOPOLOGY AND PHASE DETECTION FOR ELECTRICAL SUPPLY NETWORK

TECHNICAL FIELD

This disclosure generally relates to electrical supply networks, and more particularly relates to the discovery and maintenance of the topology and phase information of the electrical supply networks.

BACKGROUND

Utility companies typically manually track the locations of electric meters installed in the field as well as the connectivity of the electric meters to distribution transformers. For large utility companies, the number of electric meters can be upwards of a few million with distribution transformers being close to one million, rendering this manual process time consuming and error-prone. Also, the phase information is rarely recorded due to technical complexity, labor, time constraints, cost, equipment availability, and so on. In addition, the actual phase designation of the electric meters and associated upstream assets may change from time to time due to ongoing residential and commercial construction, demolition or renovation, utility equipment upgrades, repairs, or maintenance, disaster response, falling trees, storms, and so on. Similar problems may also exist in 3-phase distribution transformers with multiple electric meters connected to them. The phases of individual electric meters are typically not recorded but need to be determined for purposes of phase load-balancing on a power grid.

SUMMARY

Aspects and examples are disclosed for apparatuses and processes for detecting the topology and phase information of an electrical power distribution system. In one example, a system for discovering relationships between meters in an electrical power distribution system includes a plurality of meters connected to the electrical power distribution system and deployed at different geographical locations, a correlator communicatively connected to the plurality of meters through the communication network, and a mapper communicatively connected to the plurality of meters through the communication network. The plurality of meters are communicatively connected through a communication network. Each meter of the plurality of meters is configured for generating and transmitting data samples obtained at the meter. The correlator is configured for receiving the data samples from the plurality of meters, calculating correlations between the plurality of meters based on the data samples received from the plurality of meters, and transmitting the calculated correlations through the communication network. The mapper is configured for receiving the calculated correlations from the correlator through the communication network, and determining the relationships between at least the plurality of meters based on the calculated correlations.

In another example, a method performed by a meter for discovering relationships between a plurality of meters of an electrical power distribution system including the meter is provided. The method includes transmitting, through a local wireless network communicatively connecting the plurality of meters, a message identifying the meter as a correlator, determining that a condition for generating and transmitting data samples has met, and transmitting, through the local wireless network, a request for data samples to other meters of the plurality of meters. The method further includes receiving the data samples from the other meters of the plurality of meters through the local wireless network, calculating a sample correlation for each pair of meters among the plurality of meters based on the data samples received from the plurality of meters, and causing the relationships between the plurality of meters to be determined by transmitting the calculated sample correlation to a mapper through the local wireless network.

In yet another example, a method performed by a mapper node for discovering relationships between a plurality of meters connected to an electrical power distribution network is provided. This method includes receiving, through a communication network communicatively connecting the plurality of meters and the mapper node, data samples from the plurality of meters, and receiving, through the communication network, a first set of correlations between a first group of meters of the plurality of meters and a second set of correlations between a second group of meters. The first set of correlations and the second set of correlations are calculated based on the data samples generated by the plurality of meters. The method further includes calculating a third set of correlations between the first group of meters of the plurality of meters and the second group of meters of the plurality of meters based on the data samples of the plurality of meters, and determining the relationships between the plurality of meters based on the first set of correlations, the second set of correlations, and the third set of correlations.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
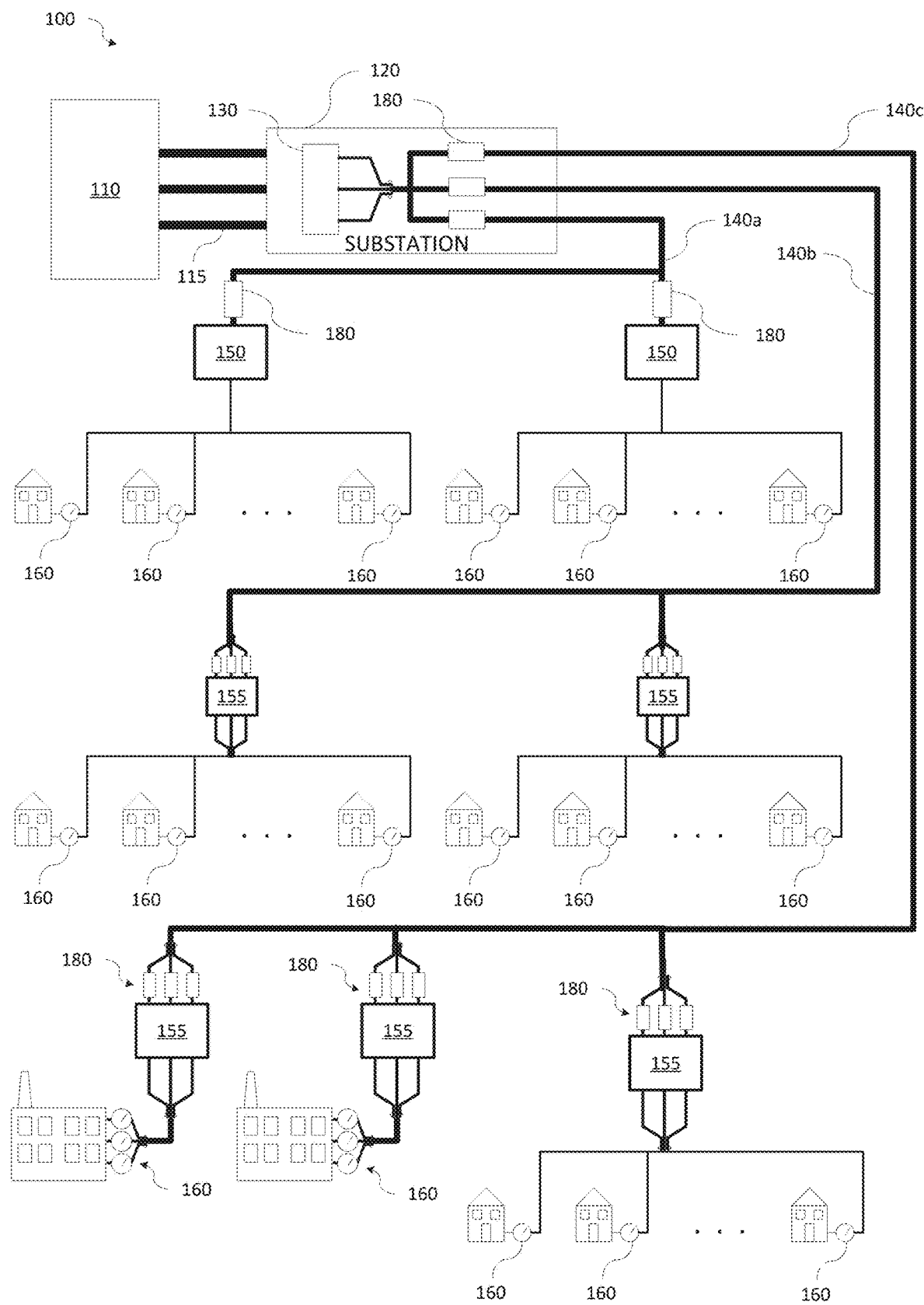
FIG. 1 is a block diagram illustrating an electrical power distribution system according to certain aspects of the present disclosure.

Systems and methods are provided for detecting topological and phase information of assets in an electrical power distribution system. The topological and phase information or relationship of assets can include the electrical connectivity relationship indicating the connections of the meters to power distribution elements such as transformers. The topological and phase information or relationship of assets can further include phase relationship indicating the connections of the meters to the three phases of the electrical power distribution system. For example, assets in the electrical power distribution system (e.g., meters) that are equipped with sensors can be configured to measure characteristic parameters of the power distribution network (e.g., voltage, current, load impedance). Assets connected to the same power distribution component (e.g., a transformer) can observe the same fluctuation in the sensed data, whereas assets connected to different components generally do not observe the same fluctuation. Likewise, assets connected to the same phase can observe the same fluctuation in the sensed data, whereas assets connected to different phases would observe a fluctuation of the sensed data with a distinct phase offset, such as an offset of ±120 degrees or an offset of 180 degrees.

As such, the assets can be configured to generate samples of the sensed data and share the data samples with neighboring assets for analysis through local network connections, such as a wireless mesh network connecting the assets. One of the neighboring assets, typically an asset with greater computing resources such as memory or processing capability, can act as a correlator to collect the data samples generated by the neighboring assets and perform higher-level computation and analysis on the shared data samples, such as statistical correlation. Based on the analysis, it can be determined which assets are connected to the same power distribution element or connected to the same phase. To determine the relationship of the neighboring assets with other assets in the power distribution system, another asset with the additional computational power can act as a mapper to combine multiple correlations from multiple correlators and determine the assets being connected to the same power distribution element or the same phase.

Techniques described in the present disclosure increase the efficiency and accuracy of the topology and phase detection for assets in an electrical power distribution system and the communication between the assets and the headend system. By configuring the assets to generate and share data samples with neighboring assets through local network connections instead of sending the data samples to the headend system, the communication bandwidth usage in the network is optimized by local transactions, and the communication bandwidth requirement to the headend system are significantly reduced. In addition, by distributing the computation among assets allows the assets that have spare computing capacity and are otherwise idle most of the time to be utilized. In this way, the processing can be decentralized without sending all the data to a single place (such as the headend system) for massive processing operations which also reduces the distance that the data needs to be moved.

In addition, by allowing the analysis of the data samples to be distributed to various correlators and mappers in the system, the computational requirements of each individual asset can be reduced. Compared with the traditional topology and phase identification approaches, the identification process proposed herein can be carried out automatically and periodically without human intervention. Consequently, a more accurate and up to date detection of topology and phase information of the power distribution system can be achieved.

In the following description, for simplicity reasons, the meter is used as an example of the assets and the transformer is used as an example of the power distribution component. Voltage data is used as an example of the sensed data by the assets. It should be understood, however, that the technology presented herein is not limited to these examples, and is applicable to other types of assets, power distribution components and sensed data.

Exemplary Operating Environment

FIG. 1 is a block diagram illustrating an electrical power distribution system 100 according to various aspects of the present disclosure. In FIG. 1, an electrical power generation facility 110 may generate electrical power. The generated electrical power may be, for example, 3-phase alternating current (AC) power. In a three-phase power supply system, three conductors each carry an alternating current of the same frequency and voltage amplitude relative to a common reference, but with a phase difference of one-third of a cycle between each. The electrical power may be transmitted at high voltage (e.g., around 140-750 kV) via transmission lines 115 to an electrical power substation 120.

At the electrical power substation 120 a step-down transformer 130 may step down the high voltage power to a voltage level more suitable for customer usage, referred to as a distribution or "medium" voltage, typically around 13 kV. The stepped down 3-phase power may be transmitted via feeders 140*a*, 140*b*, 140*c* to distribution transformers 150 which may further step down the voltage (e.g., 120-240V for residential customers). Each distribution transformer 150, 155 may deliver single-phase and/or 3-phase power to residential and/or commercial customers. From the distribution transformers 150, 155, electrical power is delivered to the customers through electric meters 160. The electric meters 160 may be supplied by the power utility company and may be connected between the loads (i.e., the customer premises) and the distribution transformers 150, 155. Three-phase transformers 155 may deliver 3-phase power to customer premises, for example, by powering three lines on the street front. In some regions, to get single-phase power, a customer premises will be randomly connected to one of these lines. This random connection or tapping leads to the utilities losing track of what premises is on what phase. In addition to 3-phase power, single-phase power may be delivered from the distribution transformers 150 to various customers from different phases of the 3-phase power generated by the utility company resulting in uneven loading on the phases.

Sensors 180 may be distributed throughout the network at various assets, for example, but not limited to, feeder circuits, distribution transformers, etc. The sensors 180 may sense various circuit parameters, for example, frequency, voltage, current magnitude, and phase angle, to monitor the operation of the electrical power distribution system 100. It should be appreciated that the illustrated locations of the sensors in FIG. 1 are merely exemplary and that sensors may be disposed at other locations and that additional or fewer sensors may also be used.

As can be seen from FIG. 1, each asset is connected to one or more phases and one or more segments of the electrical power distribution system 100. The disclosure presented herein can automatically identify the segments and phases of the assets in the electrical power distribution system 100 and update such information as the electrical connectivity (i.e. how the components are wired together electrically) and phase of the electrical power distribution system 100 change over time. The following description utilizes meters as an example of the assets. It should be understood that the described techniques also apply to other types of assets configured with sensors, such as transformers, generators, contactors, re-closers, fuses, switches, street lighting, ripple receivers, ripple generators, capacitor banks, batteries, synchronous condensers, etc.

Figure 2:
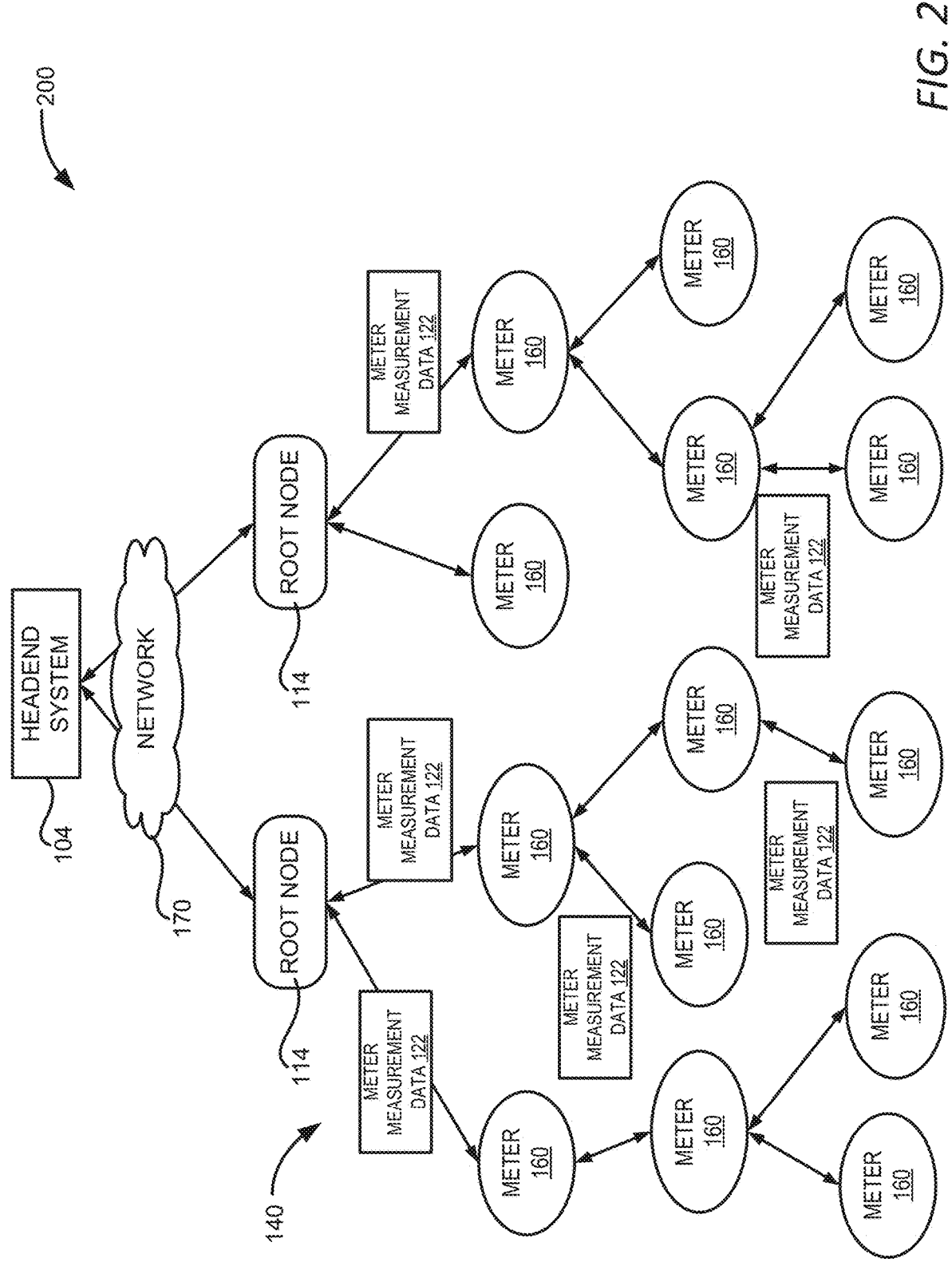
FIG. 2 is a block diagram showing an illustrative operating environment for discovering topology and phase information in an electrical power distribution system, according to certain aspects of the present disclosure.

FIG. 2 shows an illustrative operating environment 200 for discovering topology and phase information in an electrical power distribution system, such as the electrical power distribution system 100 shown in FIG. 1. The environment 200 includes a mesh network 140 associated with the electrical power distribution system for delivering measurement data obtained by meters in the electrical power distribution system. The mesh network 140 includes the multiple electricity meters 160 or meters 160 deployed at various geographical locations of the customer premises through the electrical power distribution system 100. The meters 160 can be implemented to measure various operating characteristics of the electrical power distribution system 100, such as characteristics of resource consumption or other characteristics related to power usage in the system. Example characteristics include, but are not limited to, average or total power consumption, the peak voltage of the electrical signal, power surges and load changes. In some examples, the meters 160 include commercial & industrial (C&I) meters, residential meters, and so on.

The meters 160 can transmit the collected or generated data as meter measurement data 122 through the mesh network 140 to root nodes 114. The root nodes 114 of the mesh network 140 may be configured for communicating with the meters 160 to perform operations such as managing the meters 112, collecting measurement data 122 from the meters 112 and forwarding data to a headend system 104. A root node 114 can also be configured to function as a node to measure and process data itself. The root nodes 114 may be personal area network (PAN) coordinators, gateways, or any other devices capable of communicating with the headend system 104.

The root nodes 114 ultimately transmit the generated and collected meter measurement data 122 to the headend system 104 via another network 170 such as the Internet, an intranet, or any other data communication network. The headend system 104 can function as a central processing system that receives streams of data or messages from the root nodes 114. The headend system 104, or another system associated with the utility company, can process or analyze the collected data for various purposes, such as billing, performance analysis or troubleshooting.

It should be appreciated that while FIG. 2 depicts a specific network topology (e.g., a DODAG tree), other network topologies are also possible (e.g., a ring topology, a mesh topology, a star topology, etc.). In addition, although the following description will focus on the aspects of a group of meters 160, the technologies described herein can be applied by any meter in the mesh network, including the meters 160 and the root node 114.

It should be understood that the mesh network 140 communicatively connecting the meters 160 are separate from and can overlay the network for distributing electrical power in the electrical power distribution system 100. As such, two meters 160 that are neighbors in the mesh network 140 may not be neighbors in the electrical power distribution network and vice versa. It is thus likely that two meters 160 that are connected to the same transformer may belong to different PANs and meters 160 belong to the same PAN may be connected to different transformers.

Figure 3:
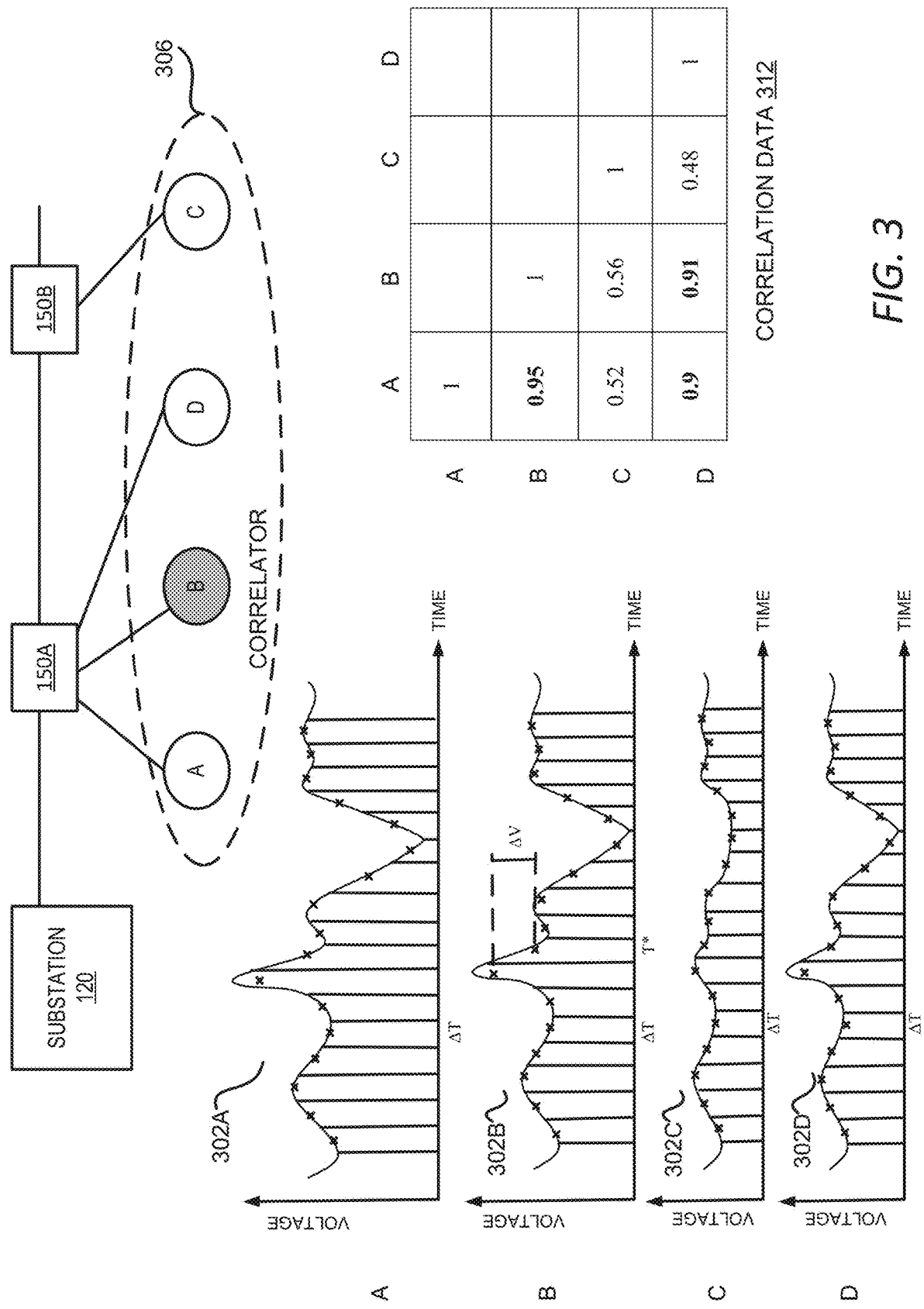
FIG. 3 shows an example of a set of meters electrically connected to the same substation and communicatively connected to each other locally, the voltage signal sensed by the meters and the correlation between the set of meters, according to certain aspects of the present disclosure.

FIG. 3 is a diagram illustrating an example of detecting topology information or phase information of an electrical power distribution system without involving the headend system. In this example, a group of meters 160 (A, B, C, and D) are electrically connected to the same substation 120 and communicatively connected to each other through local network connections. The local network can be the mesh network 140, a portion of the mesh network 140, or any network that enables the communication between the meters without involving the network for communicating with the headend system 104. Each of these meters is connected to a distribution transformer 150A or 150B on one of the three phases. As discussed above, in some regions, customer premises might be randomly connected to one of the three power lines of the 3-phase power to get single-phase power. This leads to the utility company losing track of the phase information of the meters at the premises. Similarly, there might be multiple transformers near a customer premises and the meter for that customer premises might have been randomly connected to one of these transformers leading to the utility company losing track of which premises is on which transformer. By utilizing the technology disclosed herein, the electrical connectivity relationship between the meters A, B, C and D (indicating the connections of the meters to the transformers) can be determined using local network connection between these meters without sending data to the headend system. Likewise, the phase relationship between these meters (indicating the connections of the meters to the three phases of the electrical power distribution system) can also be identified through local network communications.

In order to obtain the topological information and/or phase information of each of the meters 160, data collected at the individual meters 160, such as the voltage, current, load impedance or others can be utilized. FIG. 3 shows an example of utilizing the voltage data collected by the meters 160 to determine topological information for these meters 160. Phase information can be detected in a similar way. For each of the four meters, FIG. 3 shows the voltage values measured at different time points. These voltage values are illustrated using curves 302A, 302B, 302C, and 302D for meters A, B, C, and D, respectively.

As can be seen from the curves 302A-302D shown in FIG. 3, there can be fluctuations (e.g., peaks or dips) in the voltage values due to, for example, large loads on one or more of the power lines being switched on or off. When the fluctuation is detected at a particular meter, the neighboring meters that are connected to the same transformer as this particular meter can also detect the fluctuation at approximately the same time. Note that due to the resistance of the lines connecting this particular meter with its neighboring meters, the fluctuation may be attenuated when detected by the neighboring meters. On the other hand, for meters that are connected to a different transformer than the particular meter, the detected fluctuation may be different from that of the particular meter. Based on these properties of the power distribution system, statistical analysis can be performed to determine whether meters are connected to the same transformer or not. In some examples, correlation is used to measure the similarity between voltage values detected by different meters at approximately the same time, thereby determining whether they are connected to the same transformer.

For example, the detected voltage values at different meters can be transmitted to one of the meters in the group, referred to herein as a correlator, such as the correlator meter B. The correlator can be selected by self-nomination where a meter having the capability of performing the correlation can send a communication to other meters through the local network connection indicating that it is a correlator. The meters that can communicate with the correlator through the location network connection form a group of meters 306 for which the correlator can perform the correlation to determine how the group of meters is related. The meters in a group can communicate with each other using the same protocol used for transmitting the meter measurement data 122, or a different type of protocol.

In some examples, the voltage values can be sampled to generate voltage data for transmission to the correlator. The sampling can be performed, for example, by averaging the voltage values within each time interval T. The time interval can be configured to be the same as the time interval used to collect and generate power consumption data or other time intervals, such as 15 minutes, 1 minute or 30 seconds. Note that some applications or implementations of the technology presented here for topology or phase identification may require samples at the sub-cycle level. The averaged voltage values or voltage data samples, illustrated using cross markers "x" in FIG. 3, can be transmitted to the correlator as the voltage data. In some implementations, the voltage data can include a sequence of N averaged voltage values, where N is an integer value such as 50, 100, or 200.

The transmission of the voltage data to the correlator can be based on a pre-determined schedule or triggered by an event. For instance, the correlator can be configured to request voltage data from the meters in the group to send the voltage data at 12 a.m. every day. In another example, the correlator can be configured to detect a triggering event, and upon detecting the triggering event, to request voltage data from the meters in the group. The triggering event can include, for example, an event where the difference between two consecutive voltage data samples is higher than a threshold value of voltage change. An example of detecting such a triggering event is illustrated in FIG. 3. In this example, correlator meter B detects that the voltage change ΔV between two consecutive voltage data samples is higher than the threshold value. Upon detecting such an event, the correlator meter B sends a request to meters A, C, and D for the voltage data collected near the time T* when the event occurs. The correlator can request the meters to include a sequence of N voltage data samples collected by respective meters after, before or around the event time T* in the voltage data transmitted to the correlator. In another example, each of the meters A, C, and D, is configured to detect the triggering event. After detecting the event, each meter starts collecting samples of the voltage data at the specified time duration (before, after or around the triggering event) for a given duration (or for a given number of samples). After the collection is complete, the meters will automatically send the collected samples to the correlator B.

After receiving the voltage data, the correlator can perform cross-correlations on the voltage data to generate correlations between each pair of meters in the group of meters, referred to herein as the correlation data. In the example shown in FIG. 3, the correlation data are shown in a correlation matrix 312. An entry j) of the correlation matrix represents the correlation between meter i and meter j. Because the correlation between meter i and meter j is the same as the correlation between meter j and meter i, the entry (i, j) is the same as the entry (j, i). As such, the correlation matrix is a symmetric matrix and FIG. 3 only shows the lower half of the matrix. In addition, the diagonal of the correlation matrix always have all 1s because a meter is perfectly correlated with itself. Consequently, only half of the correlation matrix (excluding the diagonal) contains useful information and will be included in the correlation data.

In some examples, the correlation between a pair of meters can be represented using the correlation coefficient between the two sequences of voltage data samples from the pair of meters. The range of a correlation coefficient is between −1 to 1, where 1 indicates the strongest positive correlation between the two sequences of voltage data samples, 0 indicates that the two sequences of voltage data samples are independent to each other, and −1 indicates the strongest negative correlation between the two sequences of voltage data samples. It should be understood that various other types of statistical correlations can be utilized herein to measure the similarity between the voltage data of meters.

The correlation matrix 312 shown in FIG. 3 indicates that there is a strong correlation between the voltage data of meters A and B, meters A and D, and meters B and D. The correlations between the voltage data of meter C and other meters are low. This means that meters A, B, and D are likely to be connected to the same transformer 150A, whereas meter C is connected to a different transformer 150B. In this way, the topological relationship among the group of meters 306 on the distribution network can be determined.

Figure 4:
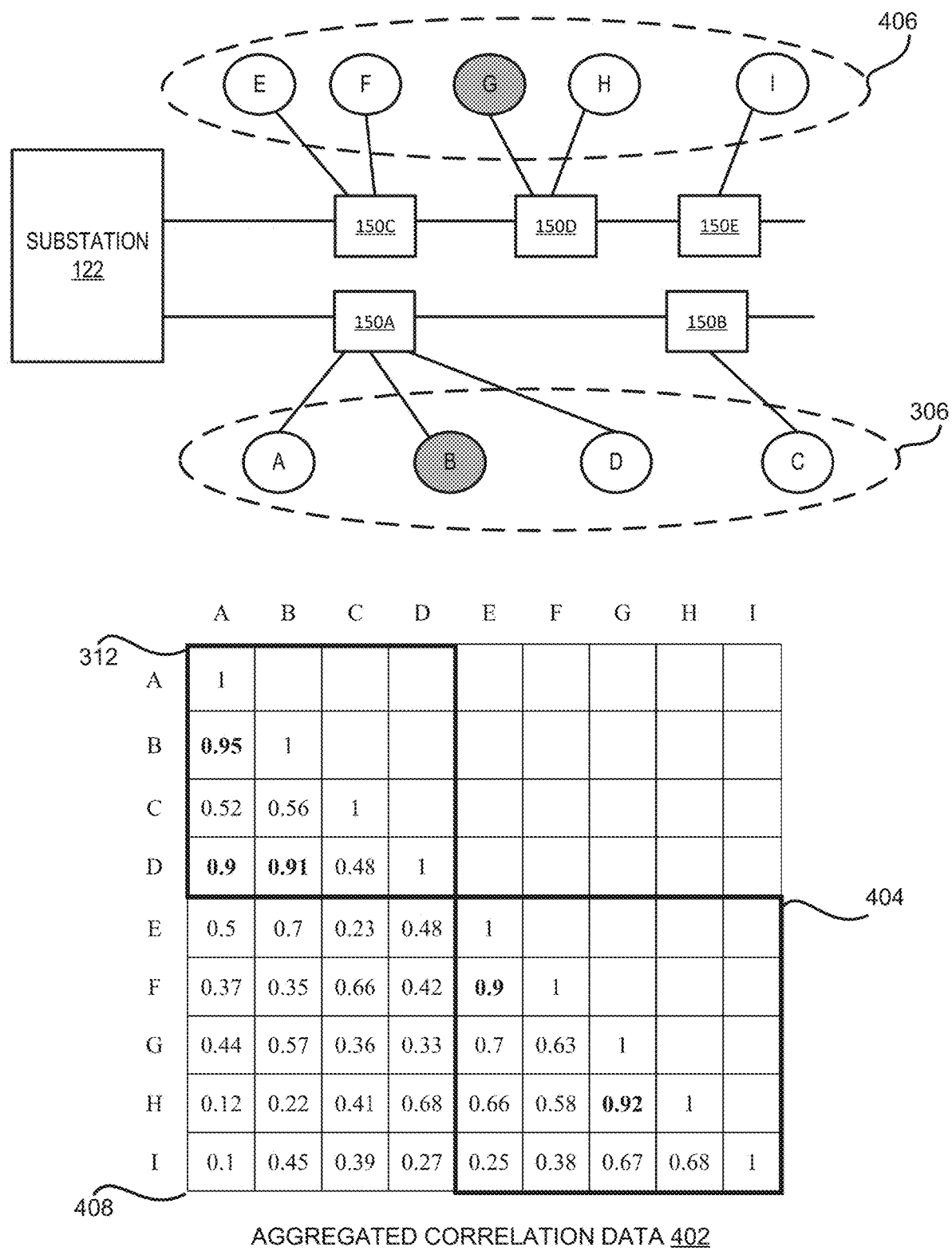
FIG. 4 shows an example of two groups of meters (including the group of meters shown in FIG. 3) and the correlations between the meters in the respective group of meters, according to certain aspects of the present disclosure.

The correlations for meters in other groups can be generated similarly. FIG. 4 shows an example of two groups of meters including the group of meters 306 shown in FIG. 3. FIG. 4 also shows the correlations between the meters in the respective group of meters, according to certain aspects of the present disclosure. In this example, a second group of meters 406 including meters E, F, G, H, and I are connected to the same substation 120 as the group 306 but through different transformers from transformer 150A and 150B. In this group of meters 406, meter G is the correlator and can communicate with other meters in the group through a local network connection. In some examples, the meters in group 306 might not be communicatively connected to the meters in group 406 through the local network connection. For example, the meters in group 306 and the meters in group 406 might be too far away to communicate directly with each other.

The correlator meter G can perform correlation for the meters in group 406 in a way similar to that performed by correlator meter B and generate correlation data 404. As indicated in the correlation data 404, because meters E and F are connected to the same transformer 150C, the correlation between the voltage data of meters E and F is as high as 0.9. Likewise, because meters G and H are connected to the same transformer 150D, the correlation between the voltage data of meters G and H is also high (0.92). Meter I, on the other hand, does not have a high correlation with other meters in group 406 because it is not connected to transformer 105E which is different from the transformers of other meters in the group.

The correlator B and correlator G can send the respective correlation data 312 and 404 to a node that is at a higher level in the correlation hierarchy and is communicatively connected to the correlator B and correlator G, referred to herein as a "mapper." The mapper can process the received correlation data to generate the correlation data for the meters in both groups. FIG. 4 also shows the aggregated correlation data 402 for the two groups 306 and 406. In FIG. 4, the submatrix 312 is generated by and transmitted from the correlator B and the submatrix 404 is generated by and transmitted from the correlator G.

In order to determine the correlations across the two groups (i.e., between meters A, B, C, D and meters E, F, G, H, I), the mapper can perform the correlations between a meter in group 306 and a meter in group 406 based on the voltage data received from these two meters. In this way, the mapper can complete the aggregated correlation data 402 for all the meters in groups 306 and 406. Based on the completed correlation data 402, the mapper can perform the mapping of the meters to their corresponding transformers. For instance, the mapper can determine that two meters are connected to the same transformer if the correlation between these two meters is higher than a threshold value of correlation, such as 0.85. In the example shown in FIG. 4, the mapper can determine that meters A, B, and D are connected to one transformer, meters E and F are connected to another transformer, meters G and H are connected to a third transformer; meters C and I are connected to another two separate transformers.

Figure 5A:
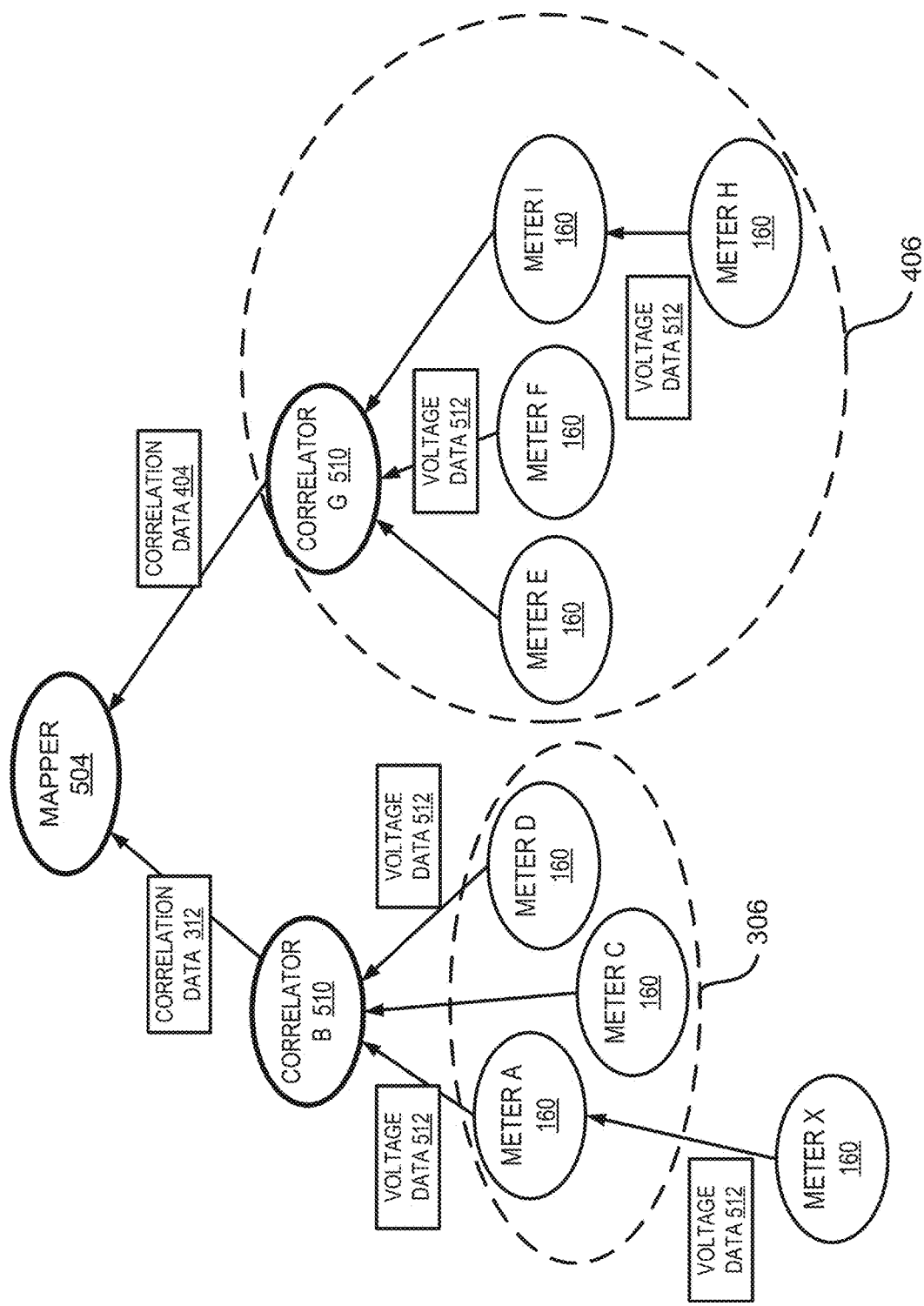
FIG. 5A shows the mesh network hierarchy of the groups of meters shown in FIG. 4, according to certain aspects of the disclosure.

FIG. 5A shows an example correlation hierarchy of the groups of meters shown in FIG. 4, according to certain aspects of the disclosure. In some examples, a correlator 510 (such as correlator B or correlator G) can be in communication with the mapper 504 through the mesh network 140 and is in a layer of the mesh network that is closer to the headend system than the meters in its group. The correlator 510 receives voltage data 512 from meters in its group and generates the correlation data (e.g., the correlation data 312 or the correlation data 404) as described above with respect to FIGS. 3 and 4. The correlator 510 further sends the correlation data to the mapper 504 to determine the aggregated correlation data for the two groups of meters and to determine the topological information of these meters. It should be understood that the meters in one group, such as meters A, C, B, and D, may belong to different PANs. The mapper, the correlators and the meters 160 may be in the same layer of the mesh network 140 or in different layers.

It should be further understood that while the above example shows that the correlator is a meter, other types of network devices, such as routers, collectors, can also serve as a correlator. Likewise, the mapper 504 can be a meter, a router, a collector, or another type of network device. As described above, a mapper can be a node of the mesh network that is located one or more layers above the correlators but no higher than the root nodes 114. It should be further understood that while the above description focuses on meter groups in which the correlator is in direct communication with other meters in each group, a group of meters can also include meters that are not in direct communication with the correlator. For example, the group (such as the group 306) can further include a meter (such as meter X in FIG. 5A) that can communicate with the correlator via another meter (such as meter A in FIG. 5A).

Although FIG. 5A is used to determine the topologic information of only two groups of meters, a mapper can cover a large number of groups of meters that are located at various layers below the mapper in the correlation hierarchy. These meters can be collectively referred to as the set of meters associated with the mapper. The correlators of individual groups in the set of meters can provide the correlation data of their respective groups to the mapper to determine the topological information for these meters. In alternative or additional implementations, instead of the correlators sending the correlation data directly to the mapper, high-level correlators can be utilized to perform a portion of the correlation before sending the correlation data to the mapper.

Figure 5B:
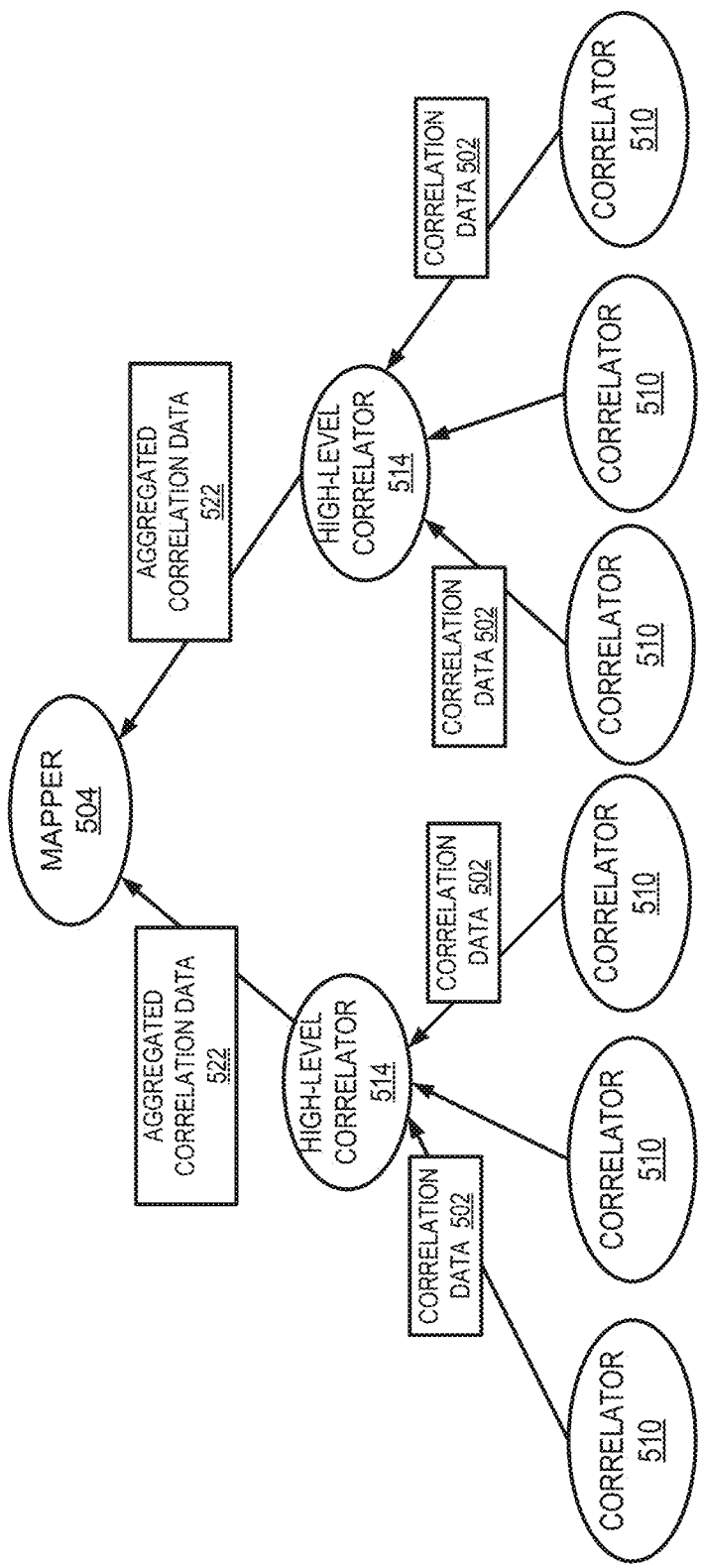
FIG. 5B shows an example of a mesh network hierarchy using multi-layer correlators, according to certain aspects of the disclosure.

FIG. 5B shows an example of the multi-layer correlator configuration, according to certain aspects of the present disclosure. In FIG. 5B, there are six groups of meters in the set of meters associated with the mapper 504 and each correlator 510 represents its corresponding group of meters. In this example, the correlators 510 can send their respective correlation data 502 to a corresponding high-level correlator 514. The high-level correlator 514 aggregates the received correlation data 502 and calculates the correlation values between meters from different groups to generate aggregated correlation data 522, similar to the aggregated correlation data 402 shown in FIG. 4. The high-level correlator 514 can then send the aggregated correlation data 522 to the mapper 504 to complete the remaining correlations and to determine the topological information of the meters. Because some of the correlation calculations are shifted to the high-level correlators 514, the workload of the mapper 504 can be reduced and thus the computation power requirements of the mapper 504 can be reduced. Similar to the correlator 510, the high-level correlators 514 can be meters, routers, collectors or other types of network devices that are capable of aggregating the correlation data 502. The high-level correlators 514 can be topologically located in a layer in the mesh network that is above or below the mapper 504 or the corresponding correlators. Additional layers of high-level correlators can be added to further reduce the workload of the mapper 504.

The above description with regard to FIGS. 3-5B describes how to detect the topological information associated with the meters in the electrical power distribution network. A similar mechanism can be utilized to detect the phase information of the meters. Because the voltages on different phases are offset by, for example, 120 degrees, correlations of the voltage values of two meters can also be used to determine whether the two meters are on the same phase or not. Different from the topology detection, the phase information detection requires voltage data to be generated with a smaller granularity because of the high frequency of the voltage on the power lines. For example, the meters can be configured to generate the voltage data with a higher frequency, such as N voltage data samples for every cycle with N being an integer value such as 50, 100 and so on. Similar to the topology detection discussed above, the generated voltage data are sent from the meters to their respective correlators which will perform correlations based on the received voltage data to generate correlation data. The correlation data can be further sent to a high-level correlator or directly to a mapper which aggregates the correlation data and generate the complete correlation between the set of meters associated with the mapper. The mapper can determine, based on the complete correlation data, the meters that are connected to the same phase. The mapper can further obtain reference phase information, such as from the substation, to determine the exact phase for individual meters.

In some implementations, the mapper 504 can be a network device at a level corresponding to a substation 120.

In other words, meters that are connected to the substation 120 can be included in the set of meters associated with the mapper 504. As such, the mapper 504 is able to identify the topological and phase information of meters that are connected to the substation 120. Because the topological and phase information above the substation level is typically known to the utility company, by determining the topological and phase information for meters under each substation, the utility company is able to gain complete information on the topology and phase of the power distribution system.

Figure 6:
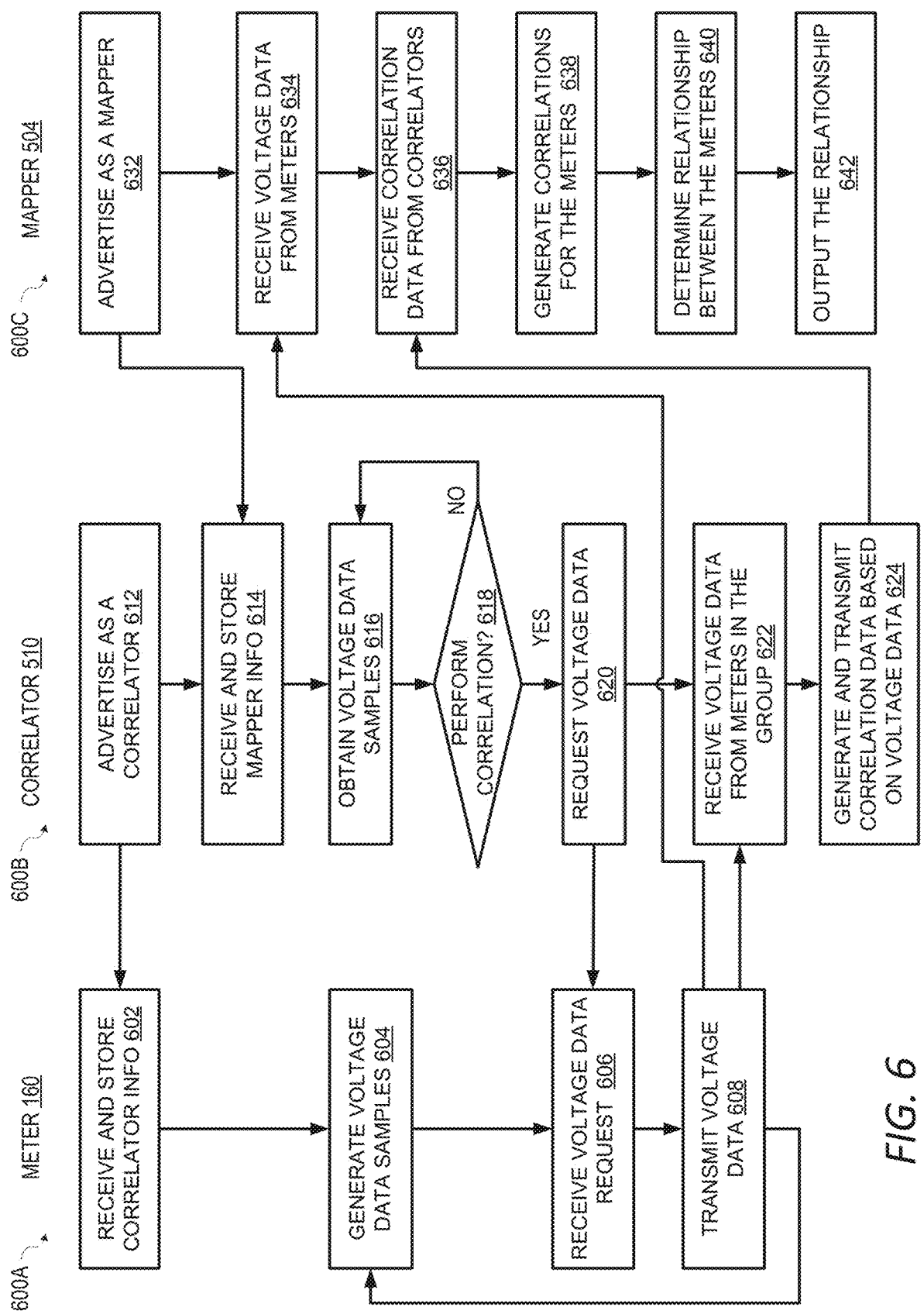
FIG. 6 shows an example of a process for identifying the topology or phase of the electrical power distribution system, according to certain aspects of the disclosure.

Referring now to FIG. 6, FIG. 6 includes several flow diagrams that illustrate several processes 600A, 600B, and 600C for identifying the topology or phase of the electrical power distribution system, according to certain aspects of the disclosure. In particular, the process 600A illustrates aspects of a non-correlator meter 160, the process 600B illustrates aspects of the correlator 510, and the process 600C illustrates aspects of the mapper 504. The meter 160, the correlator 510, and the mapper 504 can implement operations in process 600A, 600B, and 600C, respectively by executing suitable program code. The processes 600A, 600B and 600C will be described together below. For illustrative purposes, the processes 600A, 600B, and 600C are described with reference to certain examples depicted in the figures. Other implementations, however, are possible.

At block 612, the process 600B involves the correlator 510 advertising itself to the meters 160 in its group. As discussed above, the meters 160 that can directly communicate with the correlator 510 through local network connections form a group of meters associated with the correlator 510. The correlator 510 can send a message advertising itself as a correlator through the local network.

At block 602, the process 600A involves a meter 160 in the group associated with the correlator 510 receiving the message indicating that correlator 510 is the correlator for this group. The meter 160 can further store the information associated with the correlator 510, such as the address, so that voltage data generated by the meter 160 can be sent to the correct correlator. In some scenarios, if the meter 160 is in direct communication with multiple correlators, the voltage data may be received by each of these multiple correlators.

Similar to block 612, at block 632, the process 600C involves the mapper 504 sending a message advertising itself as the mapper for meters 160 located in layers of the mesh network 140 that are below the mapper. At block 614, the process 600B involves the correlator 510 receiving and storing the mapper information, such as the address of the mapper 504, etc. The above operations can be considered as the initialization operations that prepare the meters 160, the correlator 510, and the mapper 504 for topology or phase detection.

At block 616, the process 600B involves the correlator 510 (which is also a meter) obtaining voltage data samples based on the raw voltage values sensed at the correlator 510. For example, the correlator 510 can generate voltage data samples by averaging the raw voltage values sensed within individual time intervals. Depending on the information to be detected, the time interval can be set to different values. For instance, the time interval can be set to 15 minutes, 1 minute, or 1 second, if topologic information is to be detected. For phase information detection, the time interval can be set to be a value smaller than that for the topologic information detection, such as sub-cycle or even sub-millisecond.

At block 618, the process 600B involves determining whether correlations should be performed for topology or phase detection, and thus whether voltage data should be collected from the meters 160 in the group so that the correlation can be performed. The correlator 510 can make such a determination by detecting whether a triggering event has occurred. In some examples, the triggering event includes an event that a voltage data sample detected at the correlator 510 varies from the previous voltage data sample by more than a threshold amount. Other events can be utilized as the triggering event for topology and phase detecting. The correlator 510 can also determine that the correlation should be performed based on a pre-determined schedule, such as performing the correlation at a specific time of a day (e.g., 12 a.m. every day). If the correlator 510 determines that the correlations are not to be performed, the process 600B involves, at block 616, continuing to obtain voltage data samples at the correlator 510. If the correlator 510 determines that the correlations should be performed, the process 600B involves, at block 620, requesting voltage data from the meters 160 in the group by transmitting a voltage data request through the local network.

The process 600A involves, at block 604, the meter 160 obtaining raw voltage values and generating voltage data samples based on the raw voltage values. Similar to the correlator 510 described above, the meter 160 can generate the voltage data samples by averaging the raw voltage values obtained at the meter 160 within individual time intervals. The time interval used by the meter 160 is the same as the time interval used by other meters in the group and in other parts of the power distribution system. At block 606, the process 600A involves receiving the voltage data request from the correlator 510. At block 608, the process 600A involves transmitting voltage data 512 to the correlator 510 and other nodes that can receive the voltage data. In some examples, the voltage data 512 includes a sequence of N voltage data samples, where N is a positive integer number, such as 100.

At block 622, the process 600B involves the correlator 510 receiving voltage data 512 from the meter 160 and other meters in its group. At block 624, the process 600B involves generating correlation data 502. The correlation data 502 includes pairwise correlations among the meters 160 in the group associated with the correlator 510. The correlations can be included in the correlation data 502 in any form that can be understood by the correlator 510 and the mapper 504. For example, the correlations can be organized in a correlation matrix as shown in FIG. 3, in a one-dimensional vector, or any other types of data structures. The correlator 510 further transmits the generated correlation data 502 to the mapper 504.

The process 600C involves, at block 634, receiving the voltage data from the meter 160 and other meters in the set of meters associated with the mapper 504. The mapper 504 receives these voltage data from these meters so that it can calculate the correlation between meters from different groups, such as the correlations in the portion 408 of the aggregated correlation data 402. At block 636, the process 600C involves receiving the correlation data 502 from the correlator 510 and other correlators associated with the mapper 504. Because the correlation data 502 generated by the correlators 510 only include correlations between meters within a group, at block 638, the process 600C involves generating correlations for meter pairs that are from different groups. That is, the mapper 504 can generate a correlation for each pair of meters where the meters are from different groups. Combining these generated correlations with the correlation data 502 sent by the correlators 510, the mapper 504 can obtain the complete correlation information for the set of meters associated with the mapper 504. At block 640, the process 600C involves determining the relationship between the set of meters associated with the mapper 504. The relationship can include the topological information (e.g., an electrical connectivity relationship between meters indicating the connections of the meters to transformers), phase information (e.g., a phase relationship indicating connections of meters to phases of the electrical power distribution system), or both. At block 642, the mapper 504 outputs the determined relationship, for example, to the headend system 104.

Although FIG. 6 only shows the correlator 510 and the mapper 504, high-level correlators 514 can be employed as discussed above with respect to FIG. 5B to shift some of the correlation calculation from the mapper 504. Further, while FIG. 6 shows that the meter 160 and other meters sending the voltage data 512 to the correlator 510 in response to the request from the correlator 510, other implementations can also be utilized. For example, if determining whether to perform the correlation is based on a pre-determined schedule, the meters 160 can be configured to automatically send the voltage data 512 when the time for correlation is up according to the schedule.

In some implementations, transmitting and receiving data between the meters 160, the correlators 510, the high-level correlators 514, and the mapper 504 are realized through the subscription-publication mechanism. In this mechanism, a first node wishing to receive data on a specific topic from a second node can subscribe to that topic with the second node. The second node then publishes the data on the specific topic. The first node and other nodes that have subscribed to that topic will receive the data. In the topology and phase detection system presented herein, the correlator 510 can subscribe to the voltage data with each of the meters in its group. When the voltage data 512 are ready, the meters 160 can publish those voltage data 512 once through the local network and the correlator 510 and other subscribers will be able to receive the published data. Likewise, the mapper 504 can subscribe to the correlation data 502 with each of the correlator 510 associated with the mapper 504 in order to receive the correlation data 502. The mapper 504 can also subscribe to the voltage data 512 with each of the meters associated with it so that it can receive the voltage data to calculate the correlations for meters from different groups.

It should be noted that the topologic information or phase information may change from time to time. For example, new houses might be built and connected to the power lines and demolished buildings may be disconnected from the power lines. Crew members, while fixing issues associated with the power distribution system, may change the connection of the premises to the transformers. To keep the topology or phase information up to date, the above process can be repeated periodically, such as once a week, and/or whenever needed.

The identified topological information or phase information can be utilized in multiple applications. For example, the topological information can be utilized in corporative load management at the transformer level. In the corporative load management, the multiple premises connected to the same transformer can coordinate with each other to offset their power consumption to maintain the total power consumption at the transformer level to be below a given threshold to avoid losing power at the premises. In another example, the phase information can be utilized by the utility company to balance the load on different phases and to determine, for example, which of the three phases need to have a new transformer installed.

Exemplary Meter

Figure 7:
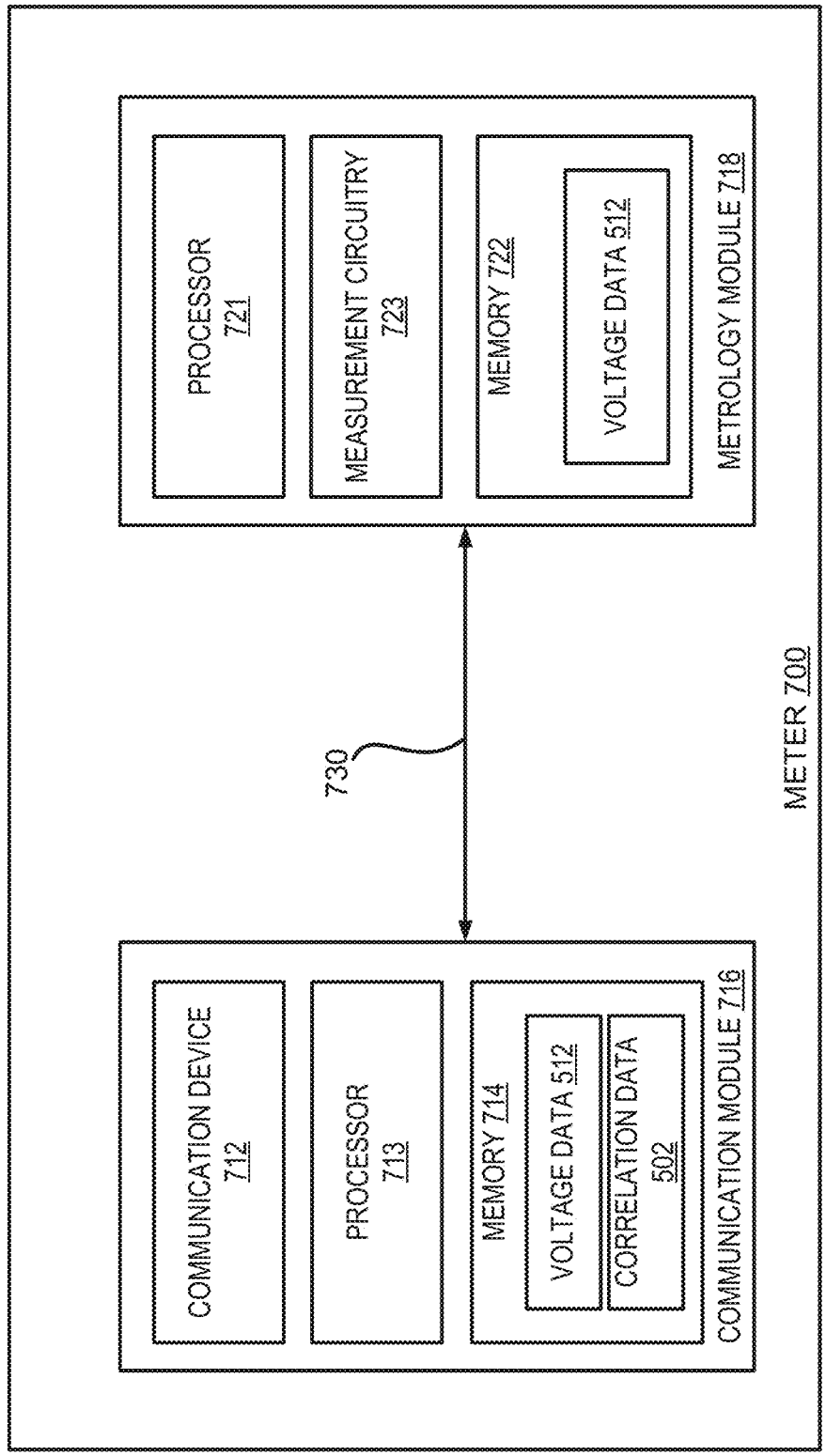
FIG. 7 is a block diagram depicting an example of a meter suitable for implementing aspects of the techniques and technologies presented herein.

FIG. 7 illustrates an exemplary meter 700 that can be employed to implement the topology and phase detection described herein, such as a meter 160, a correlator 510, or a mapper 504. The meter 700 includes a communication module 716 and a metrology module 718 connected through a local or serial connection 730. These two modules may be housed in the same unit on separate boards hence the local connection 730 may be an onboard socket. Alternatively, the modules may be housed separately and thus the local connection 730 may be a communication cable, such as a USB cable, or another conductor.

The function of the communication module 716 includes sending voltage data 512 (for meters 160 and meter correlators 510), correlation data 502 (for correlators 510) and other data to other nodes in the mesh network 140 and receiving data from the other meters or nodes in the mesh network 140. The function of the metrology module 718 includes the functions necessary to manage the resource, in particular, to allow access to the resource and to measure the resource used. The communication module 716 may include a communication device 712 such as an antenna and a radio. Alternatively, the communication device 712 may be any device that allows wireless or wired communication. The communication module 716 may also include a processor 713, and memory 714. The processor 713 controls functions performed by the communication module 716. The memory 714 may be utilized to store data used by the processor 713 to perform its function. The memory 714 may also store other data for the meter 700 such as the voltage data 512 and/or the correlation data 502.

The metrology module 718 may include a processor 721, memory 722, and measurement circuitry 723. The processor 721 in the metrology module 718 controls functions performed by the metrology module 718. The memory 722 stores data needed by the processor 721 to perform its functions and other data generated such as the voltage data 512. The communication module 716 and the metrology module 718 communicate with each other through the local connection 730 to provide data needed by the other module. The measurement circuitry 723 handles the measuring of the resource and may be used as the sensor to collect sensor data. Both the communication module 716 and the metrology module 718 may include computer-executable instructions stored in memory or in another type of computer-readable medium and one or more processors within the modules may execute the instructions to provide the functions described herein.

As discussed above, the correlator or the mapper can be a non-meter device, such as a router, a collector or another type of network device. In those scenarios, the non-meter device can include at least a processor for performing the functions of the respective device, including calculating correlations between voltage data. The non-meter device can further include a non-transitory computer-readable storage medium for storing data needed by the processor to perform its functions and other data generated by the processor, such as the correlation data, the determined topological and phase information, and so on. The non-meter device may further include a communication device that allows wireless or wired communication of at least the correlation data, the determined topological and phase information, and other data.

GENERAL CONSIDERATIONS

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system for discovering relationships between meters in an electrical power distribution system, comprising:
    a plurality of meters connected to the electrical power distribution system via a same substation and deployed at different geographical locations, wherein the plurality of meters are communicatively connected through a communication network, each meter of the plurality of meters is configured for generating and transmitting data samples obtained at the meter;
    a correlator that is one of the plurality of meters, the correlator being configured for:
        receiving the data samples from remaining meters of the plurality of meters;
        calculating correlations between the plurality of meters based on the data samples received from the remaining meters of the plurality of meters; and
        transmitting the calculated correlations through the communication network; and
    a mapper communicatively connected to the plurality of meters through the communication network and configured for:
        receiving the calculated correlations from the correlator through the communication network; and
        determining the relationships between at least the plurality of meters based on the calculated correlations, wherein the relationships between two meters comprises one or more of an electrical connectivity relationship between the two meters indicating connections of the two meters to transformers or a phase relationship between the two meters indicating connections of the two meters to phases of the electrical power distribution system, and wherein the relationships are utilized to balance load on different phases, wherein the mapper is a meter.

2. The system of claim 1, wherein
the correlator is further configured for:
    determining that a condition for collecting data samples from the plurality of meters has occurred; and
    responsive to determining that the condition has met, sending a request for data samples to the plurality of meters; and
each meter of the plurality of meters is further configured for:
    receiving the request for data samples;
    processing raw sensor values sensed by the meter to generate the data samples of the meter; and
    transmitting the data samples through the communication network.

3. The system of claim 2, wherein processing the raw sensor values to generate the data samples of the meter comprises averaging the raw sensor values sensed by the meter within each predetermined time interval, and wherein the data samples comprises a pre-determined number of averaged sensor values.

4. The system of claim 2, wherein the condition for collecting the data samples from the plurality of meters comprises a pre-determined time point has arrived.

5. The system of claim 2, wherein the condition for collecting the data samples from the plurality of meters comprises a difference between a first data sample obtained by the correlator and a second data sample previously obtained by the correlator is more than a threshold value of sample change.

6. The system of claim 1, wherein the correlator is further configured to calculate correlations between the correlator and the plurality of meters.

7. The system of claim 1, wherein the mapper is further configured for:
    receiving the data samples of the plurality of meters and data samples of a second plurality of meters;
    calculating correlations between the plurality of meters and the second plurality of meters based on the data samples of the plurality of meters and the data samples of the second plurality of meters; and
    determining relationships between meters in the plurality of meters and the second plurality of meters based on the calculated correlations.

8. The system of claim 1, wherein the correlator is further configured for transmitting, through the communication network, a message identifying the correlator as a correlator, and wherein the mapper is further configured for transmitting, through the communication network, a message indicating that the mapper is a mapper.

9. The system of claim 1, wherein the data samples comprise voltage data samples.

10. A method performed by a meter for discovering relationships between a plurality of meters of an electrical power distribution system including the meter, the method comprising:
- transmitting, through a local wireless network communicatively connecting the plurality of meters connected to the electrical power distribution system via a same substation, a message identifying the meter as a correlator, wherein the correlator is one of the plurality of the meters;
- determining that a condition for generating and transmitting data samples has met; transmitting, through the local wireless network, a request for data samples to remaining meters of the plurality of meters;
- receiving the data samples from the remaining meters of the plurality of meters through the local wireless network;
- calculating a sample correlation for each pair of meters among the plurality of meters based on the data samples received from the plurality of meters; and
- causing the relationships between the plurality of meters to be determined by transmitting the calculated sample correlation to a mapper through the local wireless network, wherein the mapper is a meter, wherein the relationships between two meters comprises one or more of an electrical connectivity relationship between the two meters indicating connections of the two meters to transformers or a phase relationship between the two meters indicating connections of the two meters to phases of the electrical power distribution system, and wherein the relationships are utilized to balance load on different phases.

11. The method of claim 10, further comprising:
responsive to determining that the condition has met, processing raw sensor data sensed by the meter to generate data samples of the meter.

12. The method of claim 11, wherein the data samples are generated by averaging the raw sensor data within individual time intervals to generate averaged samples, and wherein the data samples comprise a pre-determined number of the averaged samples.

13. The method of claim 10, wherein the data samples comprise voltage data samples.

14. A method performed by a mapper node for discovering relationships between a plurality of meters connected to an electrical power distribution system, the method comprising:
- receiving, through a communication network communicatively connecting the plurality of meters connected to the electrical power distribution system via a same substation and the mapper node, data samples from the plurality of meters;
- receiving, through the communication network, a first set of correlations between a first group of meters of the plurality of meters and a second set of correlations between a second group of meters, wherein the first set of correlations is calculated by a correlator which is one of the plurality of meters in the first group of meters based on the data samples generated by remaining meters in the first group of meters and the second set of correlations is calculated by a correlator which is one of the plurality of meters in the same group of meters based on the data samples generated by remaining meters in the second group of meters;
- calculating a third set of correlations between the first group of meters of the plurality of meters and the second group of meters of the plurality of meters based on the data samples of the plurality of meters; and
- determining the relationships between the plurality of meters based on the first set of correlations, the second set of correlations, and the third set of correlations, wherein the relationships between two meters comprises one or more of an electrical connectivity relationship between the two meters indicating connections of the two meters to transformers or a phase relationship between the two meters indicating connections of the two meters to phases of the electrical power distribution system, and wherein the relationships are utilized to balance load on different phases,
wherein the mapper node is a meter.

15. The method of claim 14, further comprising transmitting, through the communication network, a message advertising the mapper node to the plurality of meters.

* * * * *